May 27, 1952  V. C. MULLER  2,597,891
NESTABLE LEG CALIPER
Filed June 11, 1946
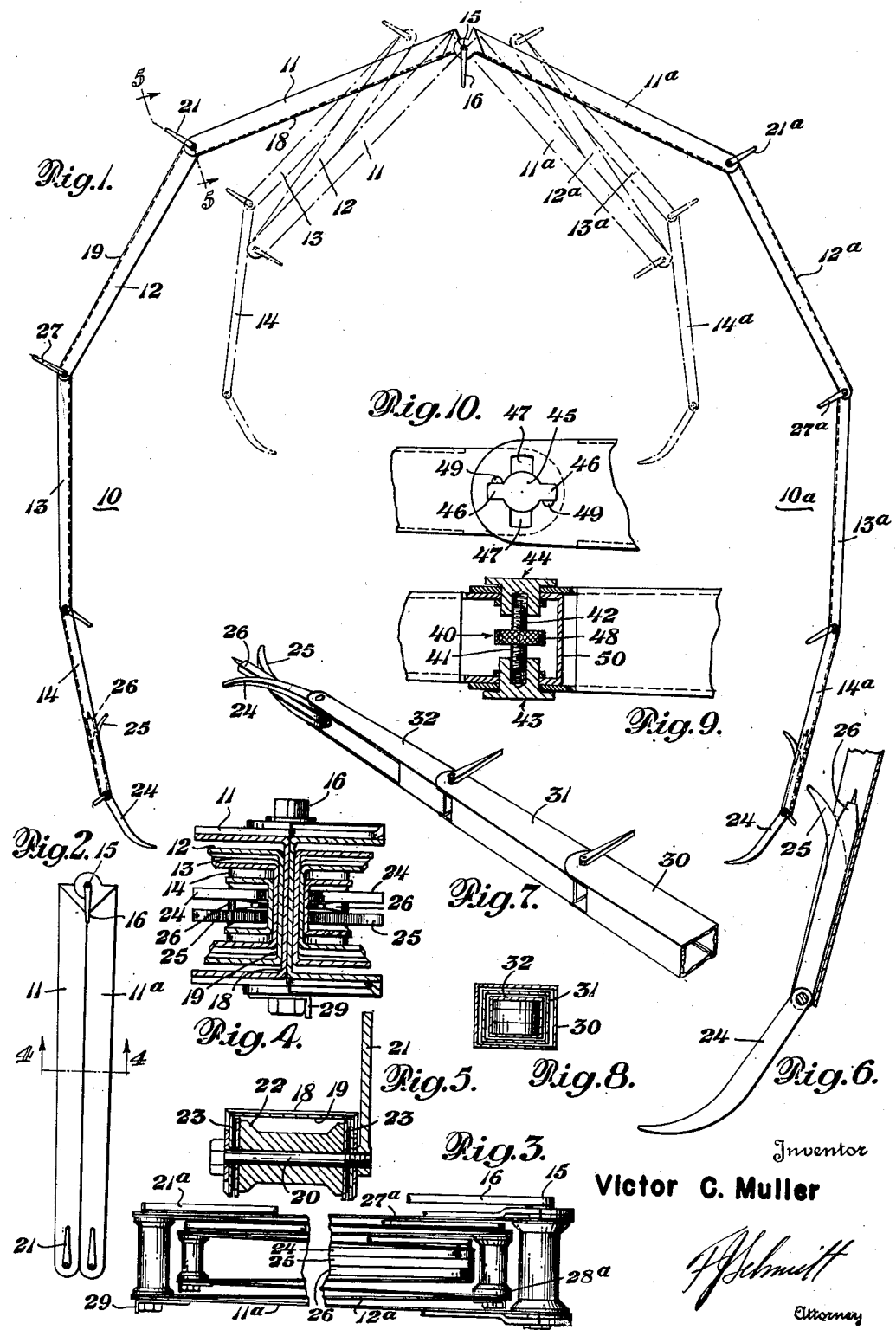
Inventor
Victor C. Muller Patented May 27, 1952

2,597,891

UNITED STATES PATENT OFFICE 2,597,891

NESTABLE LEG CALIPER

Victor C. Muller, United States Navy, assignor to the United States of America as represented by the Secretary of the Navy Application June 11, 1946, Serial No. 676,047

3 Claims. (Cl. 33—152)

(Granted under the act of March 3, 1883, as amended April 30, 1928; 370 O. G. 757)

This invention relates to calipers for taking measurements and in particular to a caliper having the legs thereof formed in a plurality of sections.

One of the uses of the invention is for obtaining unknown measurements of aircraft. When the enemy develops new military aircraft, it is important that certain dimensions thereof be known for the purpose of assessing the probable operational characteristics and for making recognition drawings. These dimensions are often obtainable only when such aircraft has crashed and been captured. This may occur in remote places, such as a jungle, where the dimensions must be taken under difficult conditions. In these instances, measuring instruments must necessarily be compact and light in weight, otherwise they would be unsuitable to transport to the aircraft which is often accessible only by foot over difficult terrain.

One of the principal objects of the invention, therefore, is the provision of a sectional leg caliper of relatively small size that is capable of taking relatively large measurements.

Another object is the provision of a caliper having sectioned legs which are nestable within the space confines of the largest section.

Another object is the provision of a caliper which has maximum rigidity with respect to its weight.

Another object is the provision of a caliper with which the profiles of curved surfaces may be determined.

Another object is the provision of a caliper which is simple in construction and easily manufactured.

Further objects and salient features will become more apparent from the specification to follow, the accompanying drawing, and the appended claims.

Referring to the drawing:

Fig. 1 is a plan view of the caliper, the full lines showing the position of the leg sections for taking large measurements and the broken lines showing the position for taking smaller measurements;

Fig. 2 is a plan view with the sections folded into their transport position;

Fig. 3 is an enlarged side elevational view of Fig. 2, with a portion of the center broken away;

Fig. 4 is an enlarged sectional view taken on line 4—4 of Fig. 2;

Fig. 5 is a sectional view taken on line 5—5 of Fig. 1;

Fig. 6 is an enlarged detail of Fig. 1;

Fig. 7 is a perspective view of a modified form of the invention;

Fig. 8 is a transverse sectional view of Fig. 7 showing the leg sections in telescoped transport position;

Fig. 9 is a side elevational view, partly in section, of a modified hinge joint; and Fig. 10 is a plan view of Fig. 9.

Referring to Fig. 1, in which the caliper is shown in two of the many possible configurations it may take, each of the respective legs 10, 10a of the caliper includes a plurality of sections 11, 12, 13, 14 and 11a, 12a, 13a, 14a, respectively. These sections are all channel shaped in cross-section, the channels being formed with flanges parallel in cross-section and a connecting web, and taper both flangewise and webwise in their longitudinal direction. The flanges on corresponding ends of sections 11, 11a are extended into overlapping relationship to provide a hinge and are pivotally connected by pivot pin 15 which is threaded at one end thereof. A locking lever 16 threadedly engages this pin and when tightened, secures sections 11, 11a in a desired position of adjustment. Section 12 is pivotally connected at its ends by similar ears and pins to sections 11 and 13. An outermost section 14 is similarly connected to section 13. Fig. 5 shows a typical sectional view of one of the pivoted joints of the sections, this particular section being taken on line 5—5. Web 19 of section 12 is shown in folded position against web 18 of section 11. Pivot pin 20 extends through the ears of the flanges of the two sections and has a locking lever 21 threadedly engaged on one end thereof. When this lever is tightened, the ears are pressed inwardly against spacer 22 securing the joint in a desired position of adjustment. Friction washers 23 of Bakelite or the like may be interposed between the ears of the flanges to facilitate securement or frictional adjustment. The webs of alternate sections of each leg lie on opposite sides of the periphery thereof when in extended position as shown in Fig. 1, that is, web 18 is on the inside and web 19 on the outside, with succeeding sections in the same relationship. When the caliper is folded into transport position, however, the channels nest, one within the other, as best illustrated in Figs. 3 and 4 with all of the sections of each leg disposed within the cross-sectional confines of the largest section. The two outer sections 11, 11a then become, in effect, a carrying case which protects the remaining sections against damage.

The tapered sections provide a leg structure of desirable strength characteristics throughout the length of the legs and also a structure which permits compact nesting of the various parts. Referring to the outermost left joint of Fig. 3, the flange ears of sections 11a and 12a are in direct contact, forming a smooth continuation from one section to the next. Referring to the left side of Fig. 3, it will be observed that the taper of the sections provides spaces between the inner sides of the flanges of section 11a and the outer sides of the flanges of section 12a. These spaces are utilized for the head 28a of the locking screw and for lever 27a. The succeeding sections are identical except for decreasing size. Angle shaped plates 29 may be employed under the heads of the various locking screws to prevent rotation thereof. These plates are fixed to the respective sections, and the upturned flange engages a flat side of the head of a locking screw. By loosening the locking levers and turning the heads to a new position, the position of the locking levers with respect to the caliper joints can be chosen as desired. With a hexagonal head, six different positions could be selected. The space requirements are materially reduced over that of a one piece construction. As illustrated with a four-section leg, the space requirements would be reduced approximately to one-fourth. The number of sections may be increased or decreased as desired, an increase in number effecting a still greater saving in space.

Sections 14 and 14a are each provided with fingers 24, 25, 26 pivotally mounted to the ends thereof and swingable into the channel of the section. These may be secured in a desired position of adjustment by the friction washer and lever construction previously described. If it is desired to take an outside measurement, fingers 24 would be used, these being adjusted to the approximate position as shown in Fig. 1. If an inside measurement is desired, fingers 25 would be swung outwardly in which case the tips of the respective fingers on the legs would be directed in opposed directions. Divider points 26 may be swung outwardly when it is desired to scribe a circle or to take a measurement between two points. Regardless of which finger, or combination of fingers is used, the undesired fingers may be folded into a position where they will not create any interference with taking the measurement.

Figs. 7 and 8 illustrate a slightly modified form of the invention. In this modification, the respective legs are formed as tubes rather than channels. Any number of legs may be employed, as in the other embodiment, but three are illustrated for simplicity. The first section 30 is pivoted to a corresponding section with a hinge joint equivalent to that shown at 15, 16 of the previous embodiment, and the succeeding sections telescope one within the other, as best shown in Fig. 8. This construction requires that the hinge joint pins be removed when it is desired to nest the sections in telescopic transport position but has the advantage that the tubular sections add torsional rigidity to the legs. The outermost section 32 may have one or both sides of the tube walls removed to permit fingers 24, 25, 26 to fold therein.

Figs. 9 and 10 show a modified form of hinge joint which may be employed in either of the two embodiments described, but probably has greatest utility in the tubular section of Figs. 7 and 8. A knurled wheel 40 has right and left hand threaded studs 41, 42 projecting from its faces which threadedly engage nuts 43, 44, respectively. The heads of these nuts carry ears 46 which draw the joint together when wheel 40 is tightened. Slots 47 permit ears 46 to pass therethrough. When it is desired to telescope the caliper into transport position, the ears are rotated into alignment with the slots, and tightening of wheel 40 draws heads 44 inwardly until the outermost portion of the head is flush with the outermost surface of the smaller section. This then permits the smaller section to be telescoped within the larger section without removing the locking screw. Holes 48 may be provided in the periphery of wheel 40 and into which a rod or pin may be removably inserted, this serving as additional leverage to tighten the joint screws. Projections 49 on the faces of the outer tube prevent rotation of the heads of the locking screws, and web 50 on the inner section resists the compressive forces when the joint is secured together.

In use, if the dimension is relatively small, legs 11 and 11a are left in their juxtaposed position to serve as a handle and only sections 14 and 14a are swung outwardly. If the dimension is larger, sections 11, 11a are opened to a position similar to that shown by the broken lines of Fig. 1. If still larger dimensions are desired, the legs are extended to the position shown by the full lines of Fig. 1. In event that there are obstructions which preclude adjusting the sections to the positions shown in Fig. 1, the various sections may be placed in numerous configurations, legs 11, 11a being swingable through about 180° and the remaining sections through about 270°. After fingers 24, 25 or 26 are adjusted and all joints tightened, the distance between the fingers is then measured with a tape or scale. If a profile is desired, such as the profile of a fuselage or wing of an aircraft, one or both of the legs is wrapped about the object and the joints are locked. A pencil mark is then made on each of the sections at the point of tangency to the profile. The caliper is then laid upon a paper and these points are transferred thereto. A smooth curve is then drawn through these points and as a final check, a different series of points is obtained from the profile of the object and the caliper is again laid upon the curve and the new set of points compared with the curve previously drawn. This will show any inaccuracy in the curve which may then be corrected. By repeating this process, any desired accuracy may be obtained.

In one operational embodiment, a caliper having dimensions when nested of about 2 x 2½ x 18 inches will measure approximately a 6½ foot diameter, yet the entire device weighs only about four pounds. This size is suitable for all measurements of most present-day fighter craft and medium bombers. For larger measurements, the caliper is merely enlarged, either by adding more sections or increasing the length of the individual sections, and for smaller dimensions the converse is obvious.

While I have described a channel section and a tubular section of box form, it is to be understood that this is for the purpose of illustration rather than limitation, and represents two practical embodiments of the invention which are simple in construction and easy to manufacture. The channel section could be U-shaped, semicircular or any other open section which would permit nesting with a swingable motion of the joints; and the tubular section could be circular or any other form of closed section which will permit axial telescoping of the sections one within another. Also, while one of the uses of the caliper is in connection with aircraft measurements, it is apparent that it will find utility on construction projects, in machine shops, or wherever a light weight, compact instrument is required. Various other modifications may be carried out without departing from the spirit and scope of my invention, and it is to be understood, therefore, that only such limitations be imposed thereon as may come within the scope of the appended claims.

The invention described herein may be manufactured and used by or for the Government of the United States of America for governmental purposes without the payment of any royalties thereon or therefor.

What is claimed is:

1. A caliper having a pair of legs pivotally connected together at corresponding ends thereof, each leg comprising at least three nestable sections each having a pair of flanges in planes normal to the axis of said pivotal connection and at least one web connecting said flanges, means for pivotally connecting adjacent sections together at their ends when in extended position, and finger means pivoted to the end of each outermost section and foldable between the flanges thereof, said sections each having a single web connecting the flanges on alternate sides of adjacent sections when the leg is in extended position, and the web width reduced in successive sections moving toward the outer ends of the legs, whereby the sections will all fold together into close nesting position one within the other with the webs all on the same sides.

2. A caliper having a pair of extensible legs pivotally connected together at corresponding ends thereof, each of said legs comprising at least three aligned sections with pivotal end connections formed on said sections whereby the sections may be linked together, the adjacent sections when in extended position being allochiral in construction with reduced transverse dimensions passing from the leg pivot section to the leg tip section and said end connections having parallel pivots, whereby the sections may be folded together in nested relationship.

3. A caliper having a pair of extensible legs pivotally connected together at corresponding ends thereof, each of said legs comprising at least three aligned sections with pivotal end connections formed on said sections whereby the section may be linked together, the adjacent sections when in extended position being allochiral in construction with reduced axial and transverse dimensions passing from the leg pivot section to the leg tip section and said end connections having parallel pivots, whereby the sections may be folded together in nested relationship.

VICTOR C. MULLER.

REFERENCES CITED

The following references are of record in the file of this patent:

UNITED STATES PATENTS

| Number | Name | Date |
| --- | --- | --- |
| 723,237 | Brown | Mar. 24, 1903 |
| 1,305,284 | Hewett | June 3, 1919 |
| 2,086,402 | Countryman | July 6, 1937 |

FOREIGN PATENTS

| Number | Country | Date |
| --- | --- | --- |
| 13,220 | Great Britain | Oct. 6, 1884 |
| 27,874 | Great Britain | Dec. 18, 1907 |
| 53,505 | Norway | Jan. 29, 1934 |
| 129,095 | Great Britain | July 2, 1919 |